(12) United States Patent
Rangaswamy et al.

(10) Patent No.: US 8,942,476 B1
(45) Date of Patent: Jan. 27, 2015

(54) SATURATION VARYING AND LIGHTING INDEPENDENT COLOR COLOR CONTROL FOR COMPUTER GRAPHICS

(75) Inventors: Sudeep Rangaswamy, San Francisco, CA (US); Apurva Shah, San Mateo, CA (US); Sharon Calahan, Petaluma, CA (US)

(73) Assignee: Pixar, Emeryville, CA (US)

( * ) Notice: Subject to any disclaimer, the term of this patent is extended or adjusted under 35 U.S.C. 154(b) by 960 days.

(21) Appl. No.: 12/952,212

(22) Filed: Nov. 23, 2010

Related U.S. Application Data

(63) Continuation-in-part of application No. 12/044,881, filed on Mar. 7, 2008, now Pat. No. 8,396,290.

(60) Provisional application No. 60/894,189, filed on Mar. 9, 2007.

(51) Int. Cl.
*G06K 9/00* (2006.01)
*G06K 9/40* (2006.01)

(52) U.S. Cl.
USPC ............................................ 382/167; 382/274

(58) Field of Classification Search
CPC .......... G06T 5/001; G06T 5/008; G06T 15/80
USPC ................... 382/162, 167, 254, 274
See application file for complete search history.

(56) References Cited

U.S. PATENT DOCUMENTS

| 5,623,527 | A  | * | 4/1997  | Scott ................................ 377/72  |
| 5,835,242 | A  | * | 11/1998 | Itoh ................................ 358/515  |
| 7,127,122 | B2 |   | 10/2006 | Ogata et al.                                  |
| 2003/0012433 | A1 |   | 1/2003  | Gruzdev et al.                             |
| 2003/0095122 | A1 | * | 5/2003  | Herken et al. ................. 345/426     |
| 2003/0156761 | A1 |   | 8/2003  | Ogata et al.                               |
| 2004/0257463 | A1 | * | 12/2004 | Goris et al. ................... 348/372    |
| 2006/0164556 | A1 |   | 7/2006  | Samadani et al.                            |
| 2008/0134094 | A1 | * | 6/2008  | Samadani et al. ............ 715/838        |
| 2008/0143739 | A1 | * | 6/2008  | Harris et al. .................. 345/604    |
| 2008/0303954 | A1 | * | 12/2008 | Haraguchi et al. ............ 348/699       |
| 2010/0278448 | A1 | * | 11/2010 | Friedhoff et al. ............. 382/274      |

OTHER PUBLICATIONS

Notice of Allowance, U.S. Appl. No. 12/044,881, dated Sep. 6, 2012.
US Notice of Allowance dated Jan. 30, 2014 for U.S. Appl. No. 13/741,501.

* cited by examiner

*Primary Examiner* — Bernard Krasnic
(74) *Attorney, Agent, or Firm* — Patterson & Sheridan LLP

(57) ABSTRACT

Color contributions from one or more light sources to scene entities are separated from the scene entities' respective unilluminated colors. This enables the color contributions of light sources as well as scene entities' unilluminated colors to be adjusted or modified independently of each other. Light source color contributions may be combined by groups of light sources, by light source to scene entity interaction, and/or by light source type. Adjustments to light source color contributions and/or unilluminated colors may be performed using a saturation varying color space or general tone mapping techniques. The light source color contributions and unilluminated colors of scene entities may be employed in contexts including an image processing application and within or as a shader of a renderer.

11 Claims, 6 Drawing Sheets

SATURATION VARYING AND LIGHTING INDEPENDENT COLOR COLOR CONTROL FOR COMPUTER GRAPHICS

CROSS-REFERENCE TO RELATED APPLICATIONS

This application is a continuation in part of U.S. patent application Ser. No. 12/044,881, filed Mar. 7, 2008, and entitled "Saturation Varying Color Space", which claims priority to U.S. Provisional Patent Application No. 60/894,189, filed Mar. 9, 2007 and entitled "Saturation Varying Color Space," both of which are incorporated by reference herein for all purposes.

BACKGROUND OF THE INVENTION

The present invention relates to the field of computer graphics, and in particular to methods and apparatus for assigning attribute values to surfaces of computer graphics models. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time. A great deal of effort has been devoted to making realistic looking rendered images and animations.

Color plays an important part in the aesthetics and emotional impact of images. Artists often design scenes with bright, vibrant colors. Later during the production, lighting designers add virtual lights to the scene to create highlights and shadows. Many computer graphics system use a simple additive illumination models. When surfaces are darkened due to shadowing using additive illumination models, the colors tend to become grey or muddy. This is because darkening colors is essentially the same as mixing black with the selected color.

In the real world, physical imagery does not suffer from these muddy colors in dark areas because of more complex, secondary light transport terms like irradiance and low level sub-surface scatter as well as aggressive use of exposure or tone curves to bring colors into the perceptually linear space.

To produce more vibrant or realistic colors in images, it is desirable to compensate for this desaturation effect. One prior approach uses tone mapping to adjust the "exposure" of the image. This changes the way that colors are mapped from light to dark. Although this corrects for desaturation in shadows and darkened areas, this tone mapping often adversely affects the contrast of the image.

Another prior approach uses colored shadows. Rather than darkening colors to black, colored shadows darken the shaded areas to a lighter color. The problem with colored shadows is that the color of the shadow is unrelated to the color of the shaded object. As a result, the shaded portions of the image look unnatural or stylized.

It is therefore desirable for a system and method to provide improved color saturation in shaded portions of an image without adversely affecting the overall image. It is also desirable for the system and method to provide users with precise control over the amount of saturation compensation applied to the image. It is also desirable for the system and method to allow for saturation compensation to be automatically applied during rendering or after rendering in post-production.

BRIEF SUMMARY OF THE INVENTION

An embodiment of the invention modifies a first color component of a pixel or scene entity using a color correction curve defined at least in part by the value of a second color component of this pixel or entity. In this embodiment, each pixel or entity has its own separate color correction curve, which is independent of the color correction curves of other pixels or entities.

In one embodiment, the saturation value of a pixel or scene entity is modified based on the pixel or entity's luminance value. The luminance value is used to determine a saturation gamma function curve. The saturation gamma function curve maps the original saturation value of a pixel or entity to a new saturation value. Because the saturation adjustment is dependent on the luminance value, dark and unsaturated colors can be modified substantially, while bright and unsaturated colors are left substantially unchanged. This embodiment may be used to increase the saturation or vibrancy of colors that are darkened due to shadows or other shading operations. This embodiment of the invention may be applied to any type of image represented in any color space in which the saturation value can be determined directly or indirectly.

A further embodiment may take into account the unilluminated color of a pixel or of an illuminated entity in a scene being rendered, in addition to or instead of the color of the pixel or entity after illumination. In this embodiment, the output color of an entity becomes a function of at least three independent parameters: at least one color component of the unilluminated color of the entity (i.e. the color of the entity not including any lighting or shadowing effects), and the luminance and saturation of the entity after illumination. For example, the illuminated color may be first normalized by the unilluminated color of that entity. After processing, the resulting modified color is converted back to its original color space, if necessary, and the normalization is reversed to produce an output color. This output color may be stored in the appropriate pixel of an image or combined with colors from other portions of the scene being rendered.

A further embodiment of the invention separates the color contributions from one or more light sources to scene entities from the scene entities' respective unilluminated colors. This enables the color contributions of light sources to be adjusted or modified independently of the scene entities' unilluminated colors. Light source color contributions may be adjusted and combined by group of light sources, by light source to scene entity interaction, and/or by light source type. This enables each of the light source color contributions from groups or types of light sources as well as the scene entities' unilluminated colors to be adjusted or modified independently of each other. The adjustment or modification of the light source color contributions and scene entities' unilluminated colors may be performed using a saturation varying color space or using any other tone mapping techniques known in the art.

Embodiments of the invention may be employed in a variety of contexts, including within or as a module to an image processing or compositing application and within or as a shader or module of a renderer. In the latter context, an embodiment of the invention may be applied to scene entities during rendering, such as points, particles, ray intersections, fragments, and geometry, such as surfaces or volumes, or to pixels in an image.

BRIEF DESCRIPTION OF THE DRAWINGS

The invention will be described with reference to the drawings, in which.

DETAILED DESCRIPTION OF THE INVENTION

Figure 1:
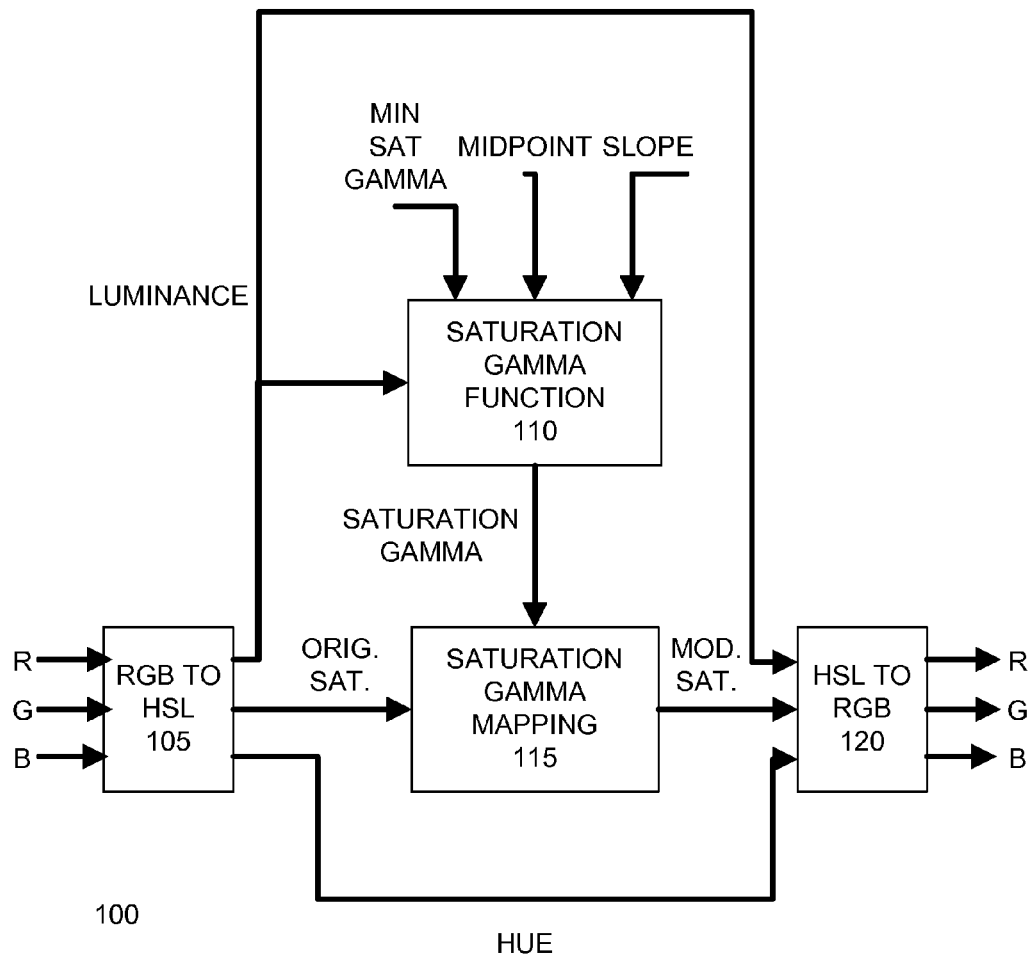
FIG. 1 illustrates a block diagram of a saturation compensation system 100 according to an embodiment of the invention.

FIG. 1 illustrates a block diagram of a saturation compensation system 100 according to an embodiment of the invention. In an embodiment, the color values of a pixel in a source image are provided to an HSL conversion block 105. The HSL conversion block 105 converts the color values of a pixel from its native color space, such as an RGB color space, to a hue, saturation, luminance (HSL) color space. The hue is the inherent color of the pixel. The luminance is the lightness of the pixel, which ranges from black to white. The saturation of the pixel is "vibrancy" of the color. Lower saturation values make the color appear more gray or muddy.

In an embodiment of the invention, the saturation value of a pixel is modified based on the pixel's luminance value. Because the saturation adjustment is dependent on the luminance value, dark and unsaturated colors can be modified substantially, while bright and unsaturated colors are left substantially unchanged.

To this end, the luminance value of the pixel is provided to the saturation gamma function 110. The output of the saturation gamma function 110 is a saturation gamma mapping value used to modify the saturation value of the pixel. The saturation gamma function determines the saturation gamma mapping value using the luminance value and one or more input parameters. In an embodiment, these input parameters are the minimum saturation gamma, which specifies how aggressively to change the saturation of dark colors; the midpoint, which is the luminance value at which the saturation of a color is unchanged; and the saturation gamma exponent, which specifies the slope of the saturation gamma function as it approaches the midpoint.

Figure 2:
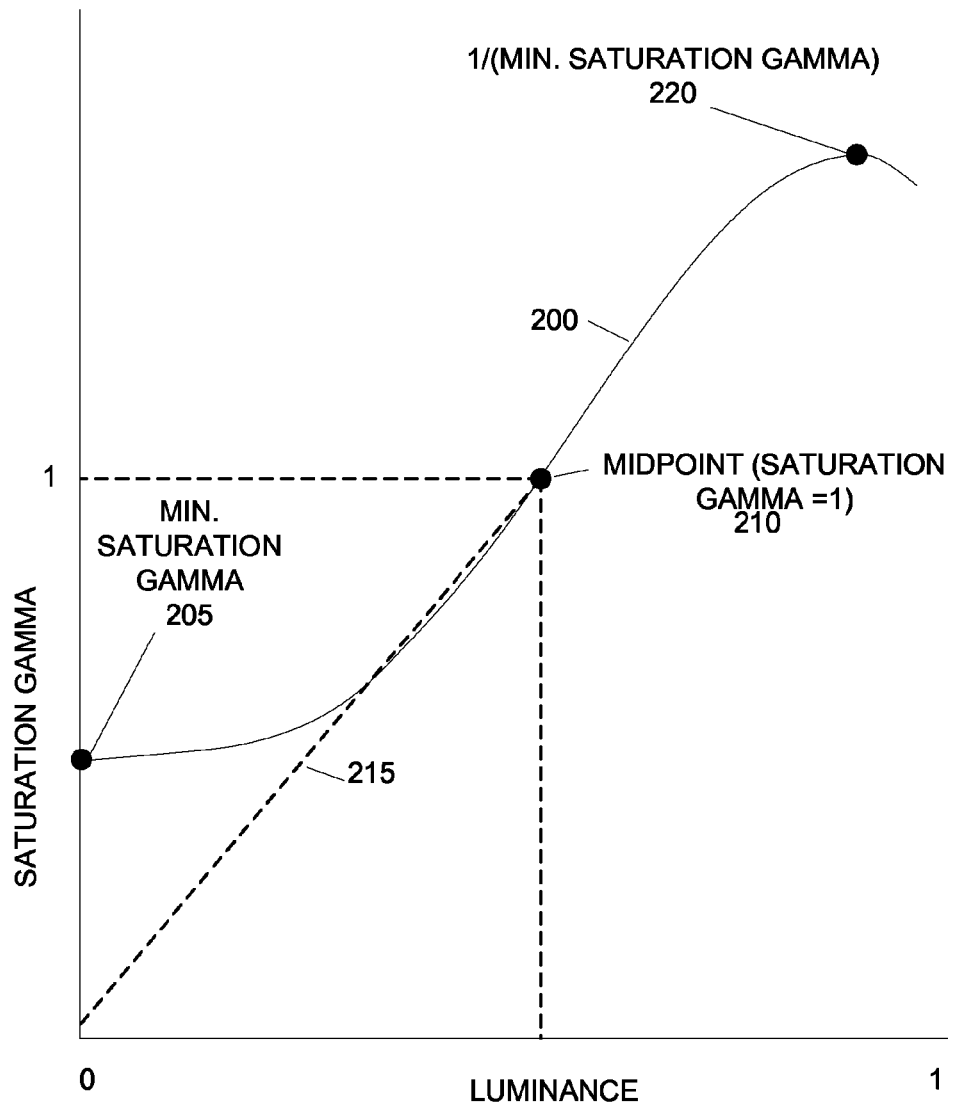
FIG. 2 illustrates an example luminance-saturation gamma curve according to an embodiment of the invention.

In an embodiment, the input parameters define a curve mapping an input luminance value to an output saturation gamma value. FIG. 2, discussed below, illustrates a luminance-saturation gamma curve in more detail.

The output of the saturation gamma function 110 is a saturation gamma mapping value used to modify the saturation value of the pixel. Saturation gamma mapping block 115 receives the saturation gamma value from block 110 and the original saturation value of the pixel $S_0$. In an embodiment, the saturation value of a pixel is modified by a gamma mapping function $S_0 = Si^{1/(SATURATION\ GAMMA)}$, where Si is the initial saturation value of a pixel and $S_0$ is the output saturation. Because the value of saturation ranges from 0 to 1, a saturation gamma value less than 1 will increase the saturation of a pixel, while a saturation gamma value greater than 1 will decrease the saturation of the pixel.

The output of the saturation gamma mapping block 115 is a modified saturation value. The modified saturation value is provided along with the original hue and luminance values of the pixel to the RGB conversion block 120. The RGB conversion block 120 converts the modified saturation value and the original hue and luminance values back to the RGB color space (or any other color space) required for the pixel.

Unlike other color modification schemes, this embodiment of the saturation gamma function varies for each pixel based on the pixel's luminance value. Thus, the final saturation value of a pixel is function of two independent inputs: the luminance value of the pixel and the initial input saturation of the pixel.

FIG. 2 illustrates a luminance-saturation gamma curve 200 in more detail. The luminance-saturation gamma curve 200 maps an input luminance value of a pixel to a saturation gamma value. Because each pixel may have a different luminance value, the saturation gamma value may also vary for each pixel. As discussed above, the curve 200 is specified by input parameters of the minimum saturation gamma 205, which specifies how aggressively to change the saturation of dark colors; the midpoint 210, which is the luminance value at which the saturation of a color is unchanged; and the saturation gamma exponent 215, which specifies the slope of the saturation gamma function as it approaches the midpoint.

As shown in FIG. 2, when the curve 200 crosses the midpoint 210, its slope is reversed to 1/(Saturation Gamma Exponent). The maximum saturation gamma value 220 that can be reached in this embodiment is 1/(minimum saturation gamma). Note that the function is undefined for $L_i$ over 1 so in order to support over range colors they have to be remapped to the 0-1 range.

In further embodiments, the luminance-saturation gamma curve 200 can be any arbitrary curve. For example, to only saturate dark colors or desaturate highlights, the value of saturation gamma can be fixed to 1 either above or below the midpoint, respectively. In some implementations, at least a portion of the curve 200 can be C2 continuous, which means curve 200 has a continuous slope and curvature, to ensure smooth color transitions.

Figure 3:
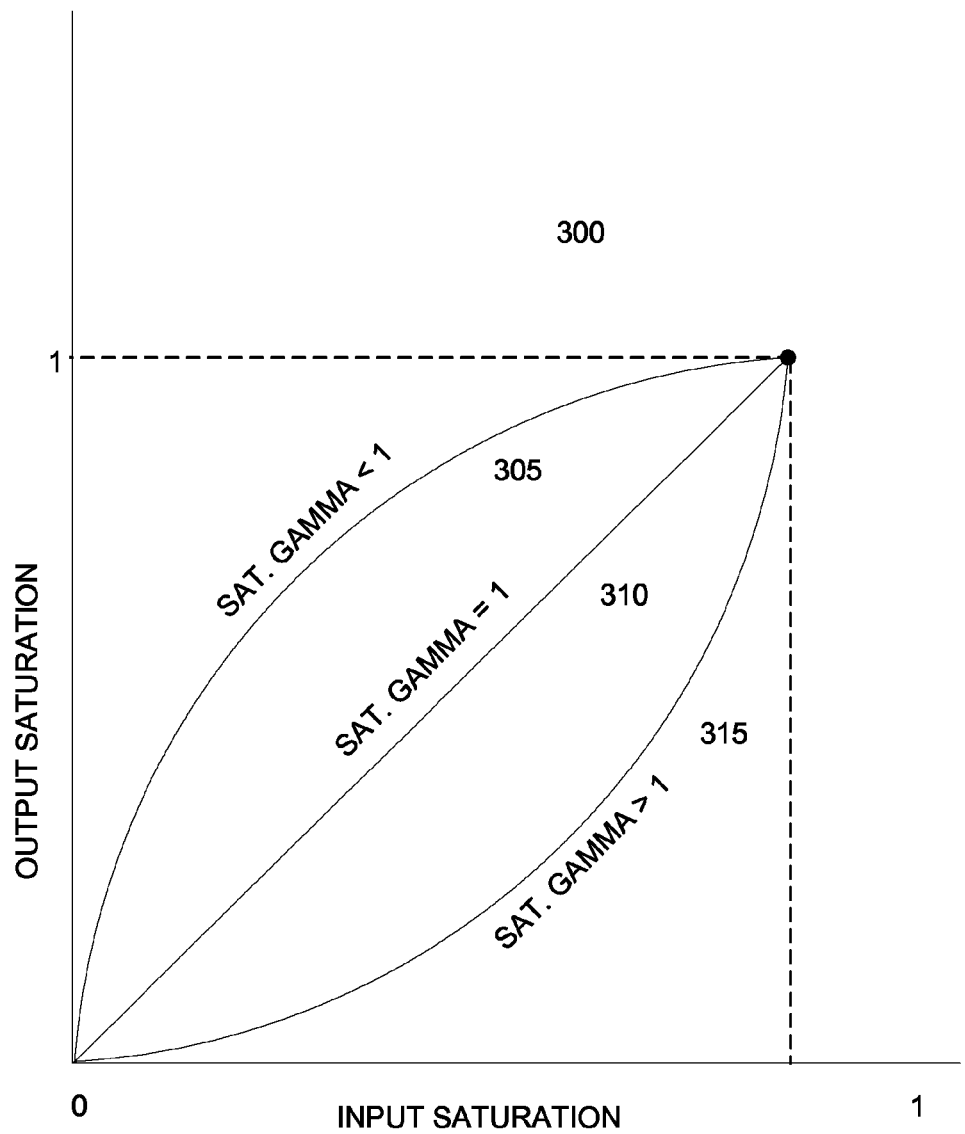
FIG. 3 illustrates example gamma function curves using saturation gamma values according to an embodiment of the invention.

FIG. 3 illustrates an example 300 of gamma function curves using saturation gamma values according to an embodiment of the invention. The gamma function curves map an input saturation value to an output saturation value. Curve 305 corresponds to a saturation gamma value less than 1, which increases the output saturation value relative to the input saturation. Curve 310 corresponds to a saturation gamma value equal to 1, which leaves the saturation unchanged. Curve 315 corresponds to a saturation gamma value less than 1, which decreases the output saturation value relative to the input saturation.

Curves 305, 310, and 315 are a subset of a family of gamma function curves generated by the expression $S_0 = Si^{SATURATION\ GAMMA}$. Each of these gamma function curves corresponds to a different luminance value. Thus, each pixel will have its saturation remapped according to the gamma function curve specified by its own luminance. One can view this family of gamma function curves as a surface defined by two independent input variables: luminance and input saturation, with the output saturation $S_0$ measured along a third axis.

Additionally, because the saturation gamma value used for a pixel is determined from the pixel's luminance value, an embodiment of the invention is essentially an image-keyed color grading system. Prior color grading systems map initial values of colors to output values of colors based on user-supplied modification parameters However, this embodiment of the invention uses an image, in this case the set of the pixels' luminance values, to provide one parameter value for each pixel to modify the saturation of that pixel.

The saturation compensation system 100 can be employed in a variety of contexts. In one application, system 100 can be implemented within or as a module to an image processing or compositing application. During production or post-production, rendered images can be viewed using this application. System 100 can be used to modify the saturation of all or portions of rendered images to fine tune the look of an image or animation. In an embodiment, users can specify the parameters defining curve 200, or can specify curve 200 directly. System 100 can then modify the image and display it to users. This application allows users to experiment with different saturation mappings of rendered images.

In another application, system 100 can be implemented within or as a shader or module of a renderer. During rendering, the system 100 can modify the saturation of one or more rendered images automatically. For example, a user can specify the luminance-saturation curve (or the parameters defining this curve) in advance of rendering and provide instructions to the renderer to apply the saturation correction to all rendered images automatically.

In this example application, the system 100 may be applied either to pixels after rendering or alternatively to the scene entities, including points, particles, ray intersections, fragments, and geometry, such as surfaces or volumes, being rendered. For example, the renderer may determine the color of a point on a surface based on the surface color, the lighting color, shadowing data, and other surface and illumination parameters. Typically, the renderer then stores this color in the appropriate pixel to form a portion of an image. However, an embodiment of the invention may first modify the color of each point of the surface as described above and store the modified color in the appropriate pixel.

In an embodiment, system 100 can take into account the unilluminated color of a pixel or of an illuminated entity in a scene being rendered, in addition to or instead of the color of the entity after illumination. In this embodiment, the output color of an entity becomes a function of at least three independent parameters: at least one color component of the unilluminated color of the entity (i.e. the color of the entity not including any lighting or shadowing effects), and the luminance and saturation of the entity after illumination. For example, the illuminated color of a point or other portion of entity being rendered may be first normalized by the maximum component of the unilluminated color of that portion of the entity. The normalized color is then processed as described above to modify its saturation value based on its normalized, illuminated saturation and luminance. The resulting modified color is converted back to its original color space, if necessary, and the normalization is reversed to produce an output color for the point or portion of entity being rendered. This output color may be stored in the appropriate pixel of an image or combined with colors from other portions of the scene entity being rendered.

For example, a renderer or a component used by a renderer, such as shading program or shader, may determine the color contributions to the scene entity (e.g. points, particles, ray intersections, fragments, and geometry, such as surfaces or volumes) from one or more light sources. In this example, as the renderer determines color contributions from light sources, these color contributions are stored separately from the unilluminated color of that portion of the scene entity, rather than being combined into a single color value during rendering. Color contributions from light sources and the unilluminated color may be stored in a single image of the scene, with separate channels of color information for light sources and unilluminated colors. Color contributions from light sources and the unilluminated color may also be stored in a multiple images of the scene, with separate images corresponding with color information for light sources and unilluminated colors. Color contributions from light sources and the unilluminated color may also be stored in association with three dimensional scene entities, rather than one or more two dimensional images. In this example, the color contributions from light sources and the unilluminated color are stored in sample points representing a one-dimensional (e.g. a particle), two-dimensional (e.g. a texel or other surface point), three-dimensional (e.g. a voxel or other volumetric representation of space), or four-dimensional (e.g. an animation or time-dependent effect, such as motion blur) portions of a scene.

Color contributions may be processed and stored separately for each light (e.g. the color contribution for light A is processed and stored separately from the color contribution for light B); each light-to-scene entity relationship (e.g. the color contribution for light A on scene entity X is processed and stored separately from the color contribution for light A on scene entity Y); and/or for each different type of light (e.g. the color contribution for specular lights is processed and stored separately from the color contribution for diffuse lights). In the latter case, color contributions from different types of lights may include specular, diffuse, and ambient lights; specular, diffuse, and ambient reflected lights; glow lights; rim lights; scattering lights; and/or any other types of light or illumination effect.

As described above, once the color contributions from light sources to scene entities are processed and stored separately from their respective unilluminated colors, embodiments of the invention may be used to adjust the color, contrast, hue, saturation, luminance, of any of the separate color contributions in a scene. Once one or more adjustments to any number of the color contributions are applied, the color contributions may be combined to determine one or more images. Adjustments to color contributions from light sources and unilluminated colors of scene entities may be applied in any color space known in the art.

In another application, system 100 can be used to modify the saturation of non-computer generated images. Furthermore, other embodiments of system 100 can operate using other color spaces besides the HSL color space, such as the HSV, YIQ, XYZ, or any other color space from which a saturation value of a pixel can be determined directly or indirectly.

Figure 5A:
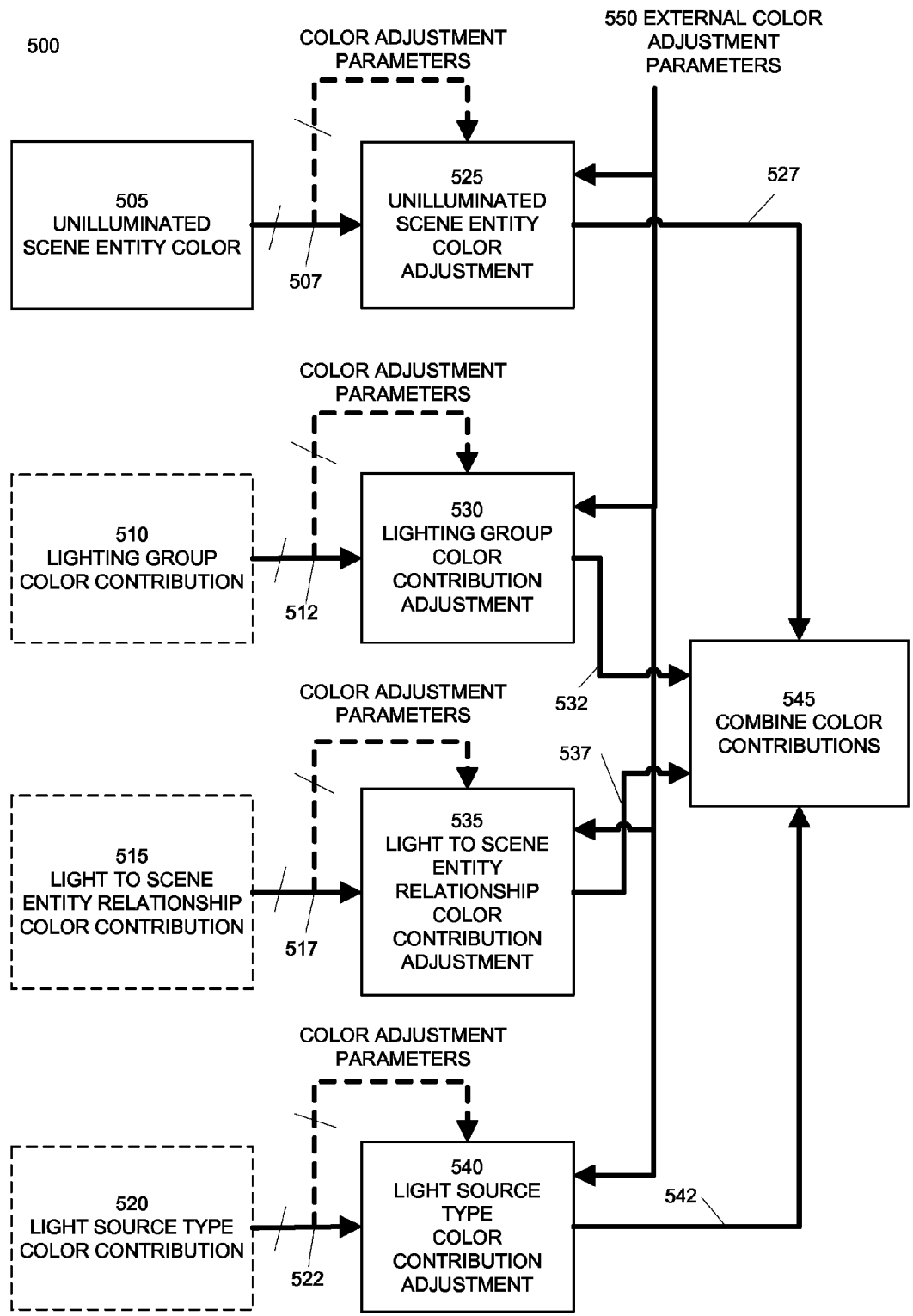
FIGS. 5A and 5B illustrate block diagrams of an example lighting independent color control system and a general color correction system according to embodiments of the invention.

FIG. 5A illustrates a block diagram 500 of an example lighting independent color control system according to an embodiment of the invention. Block diagram 500 receives color data associated with a scene entity, including the unilluminated color of the scene entity 505 and at least one light source color contribution, such as the color contribution of a group of light sources 510, the color contribution from one or more light-to-scene entity relationships 515, and/or the color contribution from one or more types of light sources 520.

One or more channels of color data associated with the scene entity are provided to separate color adjustment modules. For example, one or more channels of unilluminated color data 507 is provided to color adjustment module 525. Color adjustment module 525 may use a saturation varying color space or any other tone mapping technique to modify the unilluminated color data and output modified unilluminated color data 527. In an embodiment, the color adjustment module 525 may optionally use all or a portion of the channels of color data 507 to specify the color adjustment parameters, such as a luminance saturation curve as described above, to be applied to all or a portion of the channels of color data 507. Additionally, the color adjustment module 525 may optionally receive one or more external parameters 550, for example from a user or other application, to specify the color adjustment parameters.

Similarly, one or more channels of light source group color data 512 are provided to color adjustment module 530. Color adjustment module 530 may use a saturation varying color space or any other tone mapping technique to modify the color data from one or more groups of light sources and output modified light source group color data 532. The color adjustment module 530 may optionally use all or a portion of the channels of color data 512 and/or external parameters 550 to specify the color adjustment parameters to be applied to all or a portion of the channels of color data 512.

One or more channels of light-to-scene entity relationship color data 517 are provided to color adjustment module 535. Color adjustment module 535 may use a saturation varying color space or any other tone mapping technique to modify the color data from one or more light-to-scene entity relationships and output modified light-to-scene entity relationship color data 537. The color adjustment module 535 may optionally use all or a portion of the channels of color data 517 and/or external parameters 550 to specify the color adjustment parameters to be applied to all or a portion of the channels of color data 517.

One or more channels of color data associated with light source type 522 are provided to color adjustment module 540. Color adjustment module 540 may use a saturation varying color space or any other tone mapping technique to modify the color data 522 from one or more types of light sources and output modified light source type color data 542. The color adjustment module 540 may optionally use all or a portion of the channels of color data 522 and/or external parameters 550 to specify the color adjustment parameters to be applied to all or a portion of the channels of color data 522.

Depending on user preferences, one or more of the color adjustment modules may pass through color data unmodified; therefore, the system of block diagram 500 may be used to modify the color data from any arbitrary combination of the unilluminated color and/or light source color contributions. The modified color data 527, 532, 537, and/or 542 is provided to color combination module 545. Color combination module combines the modified color contributions together according to any color combination technique known in the art, including linear and non-linear combinations.

Figure 5B:
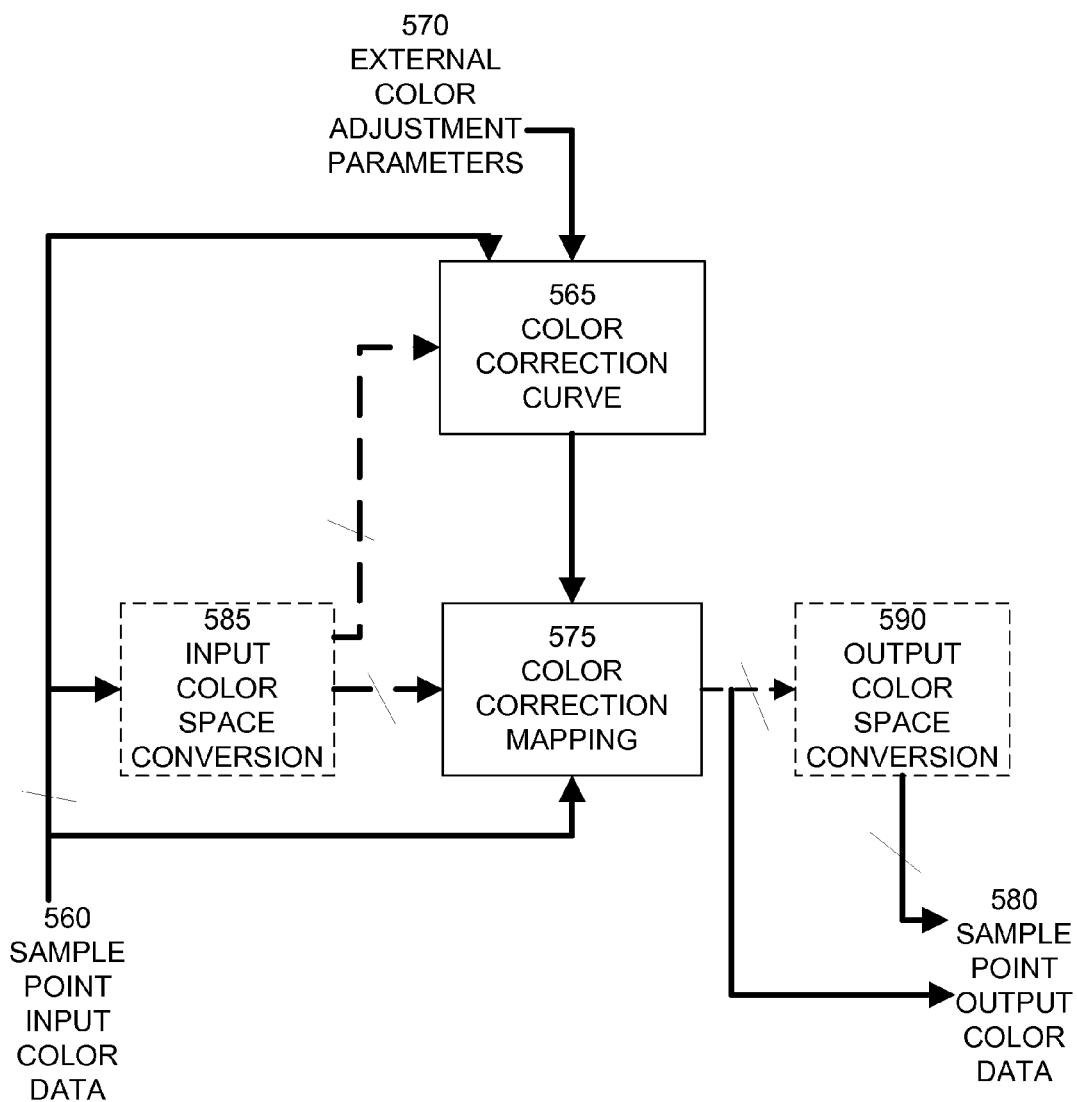

FIG. 5B illustrates an example general color correction system 555 according to an embodiment of the invention. Color correction system 555 receives sample point input color data 560. Sample point input color data 560 may include one or more channels of color data expressed in any arbitrary color space. One or more channels of the sample point input color data 560 is provided to color correction curve generation module 565. The color correction curve generation module may optionally receive one or more external color adjustment parameters 570. The color correction curve generation module 570 generates a color correction curve based on at least the channels of color data that it receives. Because the color correction curve is based on at least one channel of the sample point input color data 560, the color correction curve may be different for different sample points.

The color correction curve generated based at least in part on at least one channel of color data from the sample point input color data 560 is provided to color correction mapping module 575. The color correction mapping module 575 applies the color correction curve to the sample point input color data 560 and produces sample point output color data 580.

In a further embodiment, color space conversion may optionally be applied to the sample point input color data 560 and/or the sample point output color data 580. In this embodiment, an input color space conversion module 585 converts the sample point input color data 560 to a different color space, such as HSL, One or more channels of the converted input color data are provided to the color correction curve generation module 565 and/or the color correction mapping module 575. Similarly, the output of the color correction mapping module 575 may optionally be provided to output color space conversion module 590 for conversion back to the sample points initial color space or any other color space. The result of this optional output color space conversion is the sample point output color data 580.

Figure 4:
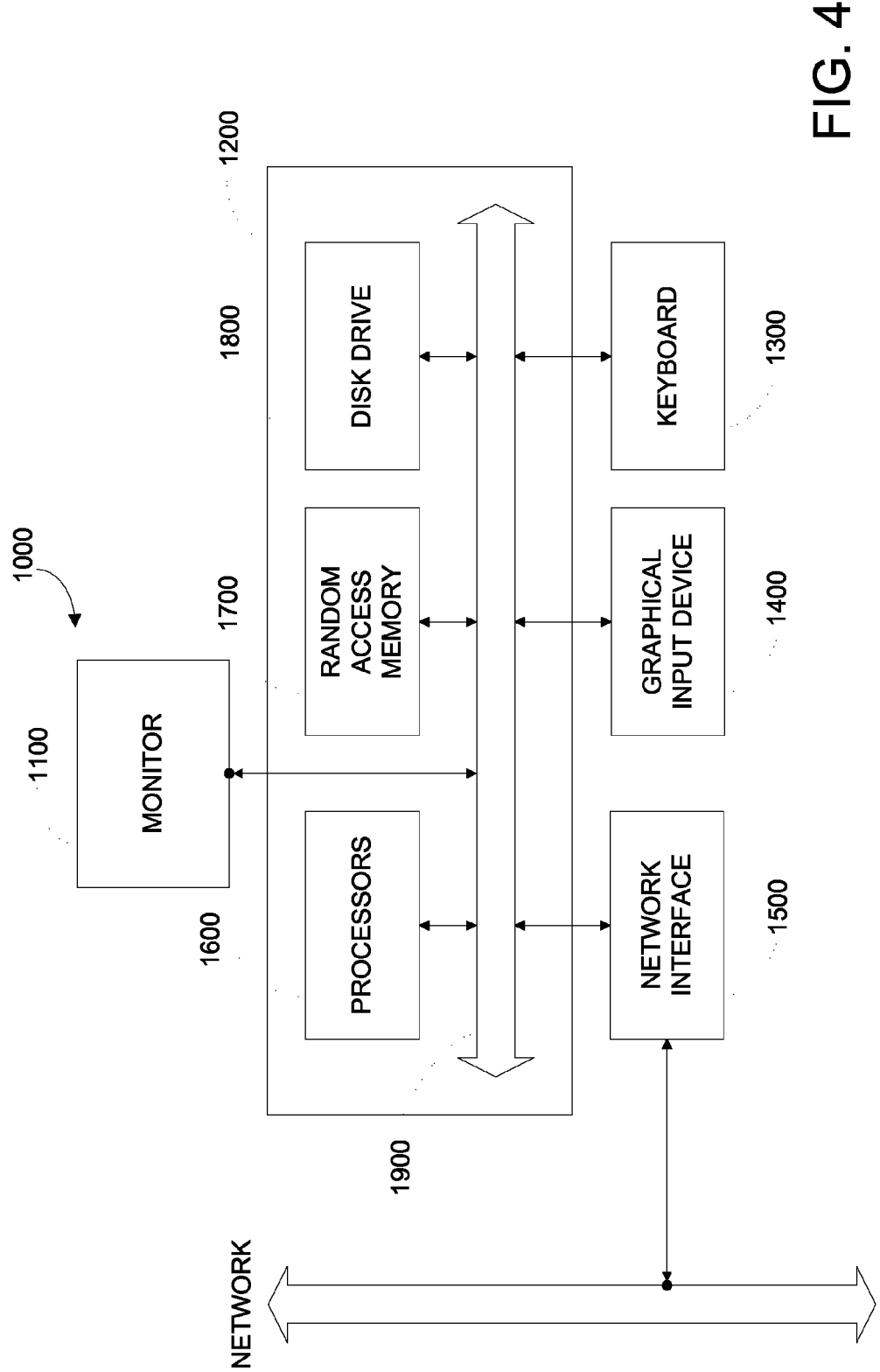
FIG. 4 illustrates a computer system suitable for implementing an embodiment of the invention.

FIG. 4 illustrates a computer system suitable for implementing an embodiment of the invention. Computer system 1000 typically includes a monitor 1100, computer 1200, a keyboard 1300, a user input device 1400, and a network interface 1500. User input device 1400 includes a computer mouse, a trackball, a track pad, graphics tablet, touch screen, and/or other wired or wireless input devices that allow a user to create or select graphics, objects, icons, and/or text appearing on the monitor 1100. Embodiments of network interface 1500 typically provides wired or wireless communication with an electronic communications network, such as a local area network, a wide area network, for example the Internet, and/or virtual networks, for example a virtual private network (VPN).

Computer 1200 typically includes components such as one or more processors 1600, and memory storage devices, such as a random access memory (RAM) 1700, disk drives 1800, and system bus 1900 interconnecting the above components. Processors 1600 can include one or more general purpose processors and optional special purpose processors for processing video data, audio data, or other types of data. RAM 1700 and disk drive 1800 are examples of tangible media for storage of data, audio/video files, computer programs, applet interpreters or compilers, virtual machines, and embodiments of the herein described invention. Other types of tangible media include floppy disks; removable hard disks; optical storage media such as DVD-ROM, CD-ROM, and bar codes; non-volatile memory devices such as flash memories; read-only-memories (ROMS); battery-backed volatile memories; and networked storage devices. Disk drive 1800 can include one or more hard disk drives connected to the computer 1200 via an internal connection, such as parallel or serial ATA, or via an external connection, such as iSCSI or other storage area network standards. Disk drive 1800 can use redundancy, such as a RAID subsystem, to improve performance, data integrity, and drive uptime.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of modifying color data of at least one rendered image, the method comprising:
   receiving sample points associated with a computer graphics scene, wherein at least one sample point includes first color data including an unilluminated color of a scene entity, second color data including a first light source color contribution, and third color data including a second light source color contribution;
   modifying the first color data for the at least one sample point;
   modifying the second color data for the at least one sample point independently of modifying the first color data;
   modifying the third color data for the at least one sample point independently of modifying the first color data; and
   determining an output color for the at least one sample point based on at least the modified first color data, the modified second color data, and the modified third color data;
   wherein the first light source color contribution comprises a color contribution from one or more light-to-scene entity relationships;
   wherein each light-to-scene entity relationship included in the one or more light-to-scene entity relationships defines a color contribution of one light source on one scene entity;
   wherein the second light source color contribution comprises a color contribution of a group of light sources, wherein the first light source color contribution is different from the second light source color contribution.

2. The method of claim 1, wherein the at least one sample point represents portions of the computer graphics scene before projection to an image plane.

3. The method of claim 1, wherein the at least one sample point represents portions of the computer graphics scene after projection to an image plane.

4. The method of claim 3, wherein the first color data is stored in at least a first channel of the rendered image and the second color data is stored in at least a second channel of the rendered image.

5. The method of claim 1, wherein the first light source color contribution includes a color contribution of a set of light sources to a scene entity in the computer graphics scene.

6. The method of claim 5, wherein the set of light sources are of a same light source type.

7. The method of claim 1, wherein the first light source color contribution includes a color contribution of a single light source in the computer graphics scene.

8. The method of claim 7, wherein the first light source color contribution includes the color contribution of the single light source to a single scene entity.

9. The method of claim 7, wherein the first light source color contribution includes the color contribution of the single light source to scene entities.

10. The method of claim 1, comprising:
    modifying the second color data using a saturation varying color space.

11. The method of claim 1, wherein the unilluminated color of the scene entity is based on an intrinsic color attribute of the scene entity independent of any light source contribution.

* * * * *